S. H. WHEELER & L. V. ROUSE.
POTATO DIGGER.
No. 90,142.   Patented May 18, 1869.
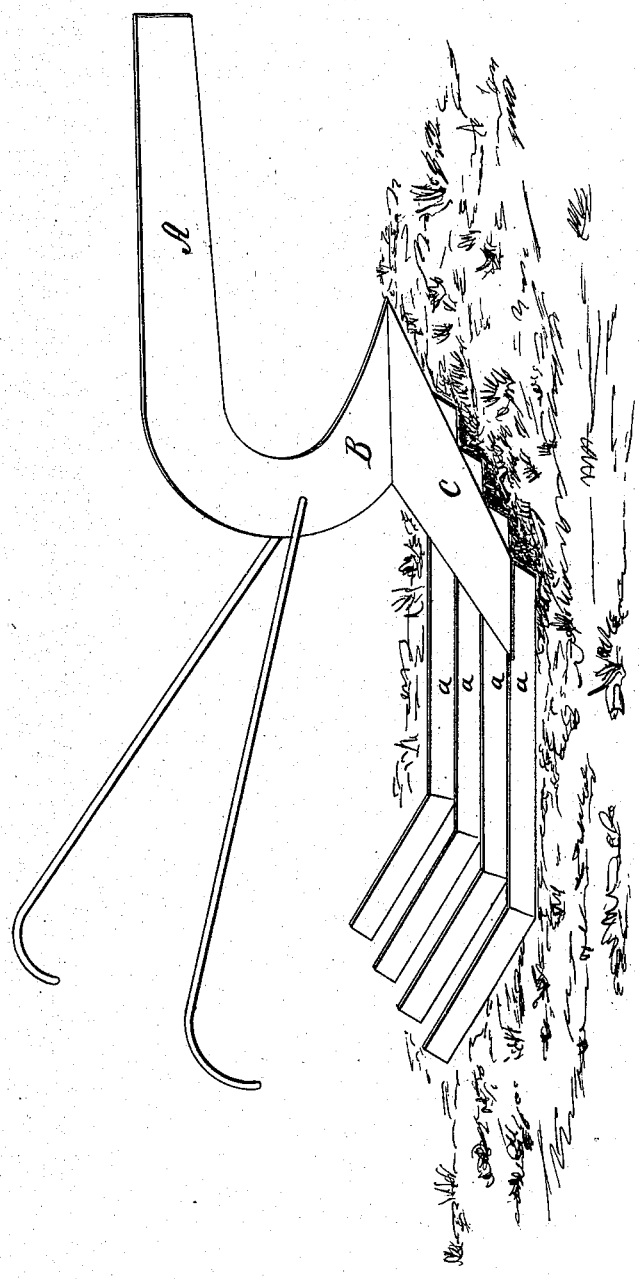

United States Patent Office.

SHEPHERD H. WHEELER AND LYMAN V. ROUSE, OF DOWAGIAC, MICHIGAN.

Letters Patent No. 90,142, dated May 18, 1869.

---

IMPROVEMENT IN POTATO-DIGGERS.

---

The Schedule referred to in these Letters Patent and making part of the same.

---

*To all whom it may concern:*

Be it known that we, SHEPHERD H. WHEELER and LYMAN V. ROUSE, of Dowagiac, county of Cass, and State of Michigan, have invented a new and improved Potato-Digger; and we do hereby declare that the following is a full and exact description of the construction and operation of the same, reference being had to the annexed drawings, making a part of this specification, in which—

Figure 1 is a perspective view.

The nature of our invention consists in attaching a subterraneous comb to the under side of a plowshare, having upward-inclined teeth, extending to the surface of the ground, for the purpose of combing the potatoes to the surface as the plow is drawn forward, where they can be conveniently gathered.

To enable others skilled in the arts to make and use our invention, we will proceed to describe its construction and operation.

We make the beam A and standard B, also share C, of iron, cast in one piece.

The bars $a\ a\ a\ a$ should be made of steel, about one and one-half inch ($1\frac{1}{2}$) wide, and about one-fourth ($\frac{1}{4}$) inch thick, and are attached to the under side of the share C.

The front ends of bars $a\ a\ a\ a$ are shaped like a sled-runner, and are made sharp, in order to cut their way through the ground.

The rear ends of said bars are bent up, forming a comb, with the teeth inclined backward, giving them a lifting tendency as they draw under the potatoes.

The share C must be sufficiently long to embrace the entire potato-hill, and the distance between the bars $a\ a\ a\ a$ must be less than half the diameter of the smallest potato to be dug, so that if the first tooth passes a potato it will be struck by the second tooth on the side of the centre of the potato next to the first tooth, which will turn it in position to be in like manner caught by the third tooth, and in like manner by all of the succeeding teeth, until fetched to the surface of the ground, and thrown to one side of the comb.

It will be seen, that as the bars $a\ a\ a\ a$ are set their entire width below the share C, they will be embedded in the solid earth below the potatoes, and below the surface of the ground left by the share, and the spaces between the bars $a\ a\ a\ a$ will be filled by the solid earth, which will prevent the said bars from working out of their position, and prevents the horizontal portion of said bars from drawing along the dirt above them, as would be the case if said bars were set in the rear of the share, and drawing above the plane formed by the share.

We are aware that potato-diggers are so constructed, but we purpose to set the bars $a\ a\ a\ a$ so as to cut the entire depth of their horizontal portion in the ground below, and undisturbed by said share, so that the entire mass of dirt and potatoes passing over the share will fall upon its own native bed.

The length of the horizontal portion of the bars should be such as to allow of a sufficient weight of earth between the inclined ends of the bars or comb-teeth and said share, to prevent the same from dragging forward, as said teeth draw through the ground broken up by the share C.

The handles E E are attached in any suitable manner.

We also purpose using a plow-wheel under the beam, in the usual manner.

Having thus described our invention,

What we claim as new, and desire to secure by Letters Patent, is—

1. The bars $a$, when constructed, combined, and arranged as set forth.

2. In combination with the bars $a\ a\ a\ a$, the beam A, standard B, and share C, substantially as and for the purposes set forth.

In testimony that we claim the foregoing, we hereunto set our hands, this 27th day of October, 1868.

SHEPHERD H. WHEELER.
LYMAN V. ROUSE.

Witnesses:
H. MICHAEL,
GEO. BOWLING.